United States Patent
Madaan

(10) Patent No.: US 10,783,722 B2
(45) Date of Patent: Sep. 22, 2020

(54) SHORT RANGE COMMUNICATIONS FOR SPECIFIC DEVICE IDENTIFICATION DURING MULTI-DEVICE PROXIMITY

(71) Applicant: PAYPAL, INC., San Jose, CA (US)

(72) Inventor: Gautam Madaan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/022,614

(22) Filed: Jun. 28, 2018

(65) Prior Publication Data

US 2020/0005557 A1    Jan. 2, 2020

(51) Int. Cl.

| | |
|---|---|
| *G07C 5/02* | (2006.01) |
| *H04W 4/02* | (2018.01) |
| *G06Q 20/14* | (2012.01) |
| *G06Q 50/30* | (2012.01) |
| *H04W 8/00* | (2009.01) |

(52) U.S. Cl.
CPC ............. *G07C 5/02* (2013.01); *G06Q 20/14* (2013.01); *G06Q 50/30* (2013.01); *H04W 4/023* (2013.01); *H04W 8/005* (2013.01)

(58) Field of Classification Search
CPC ...... H04W 4/80; G05D 1/0022; G05D 1/0027
See application file for complete search history.

(56) References Cited

U.S. PATENT DOCUMENTS

| | | | | |
|---|---|---|---|---|
| 2012/0232742 | A1* | 9/2012 | Elliott | H04W 76/19 |
| | | | | 701/29.7 |
| 2016/0337294 | A1* | 11/2016 | Garg | H04L 51/18 |
| 2017/0115125 | A1* | 4/2017 | Outwater | H04W 4/40 |
| 2017/0294130 | A1* | 10/2017 | Donnelly | G08G 1/202 |
| 2017/0351977 | A1* | 12/2017 | Bijor | G06Q 10/02 |
| 2017/0358147 | A1* | 12/2017 | Brinig | G07B 15/02 |
| 2018/0039917 | A1* | 2/2018 | Buttolo | G01C 21/3438 |
| 2018/0058866 | A1* | 3/2018 | Houston | G01C 21/20 |
| 2018/0109908 | A1* | 4/2018 | Swanson | H04W 4/80 |
| 2018/0189713 | A1* | 7/2018 | Matthiesen | H04L 67/16 |
| 2018/0283890 | A1* | 10/2018 | Zhao | G01C 21/3484 |
| 2019/0166473 | A1* | 5/2019 | Venkatraman | G01C 21/3438 |

* cited by examiner

*Primary Examiner* — Wen W Huang
(74) *Attorney, Agent, or Firm* — Haynes and Boone, LLP

(57) ABSTRACT

There is provided systems and methods for short range communications for specific device identification during multi-device proximity. A user may utilize a device to request a service at a specific location, such as a transportation service or ride sharing service. When arriving at the location, short range wireless communications between the user's device and the service provider's device may be used to detect the proximity of the devices to each other and exchange tokens that are used for identification of the other party. The communications may further be used to determine when the device are within communication range, and when the communication range ends indicating that the parties have moved outside the proximity range for the communications and the service has ended. At the end of the connection, a transaction for the service may automatically be generated and processed without requiring additional user input.

20 Claims, 5 Drawing Sheets

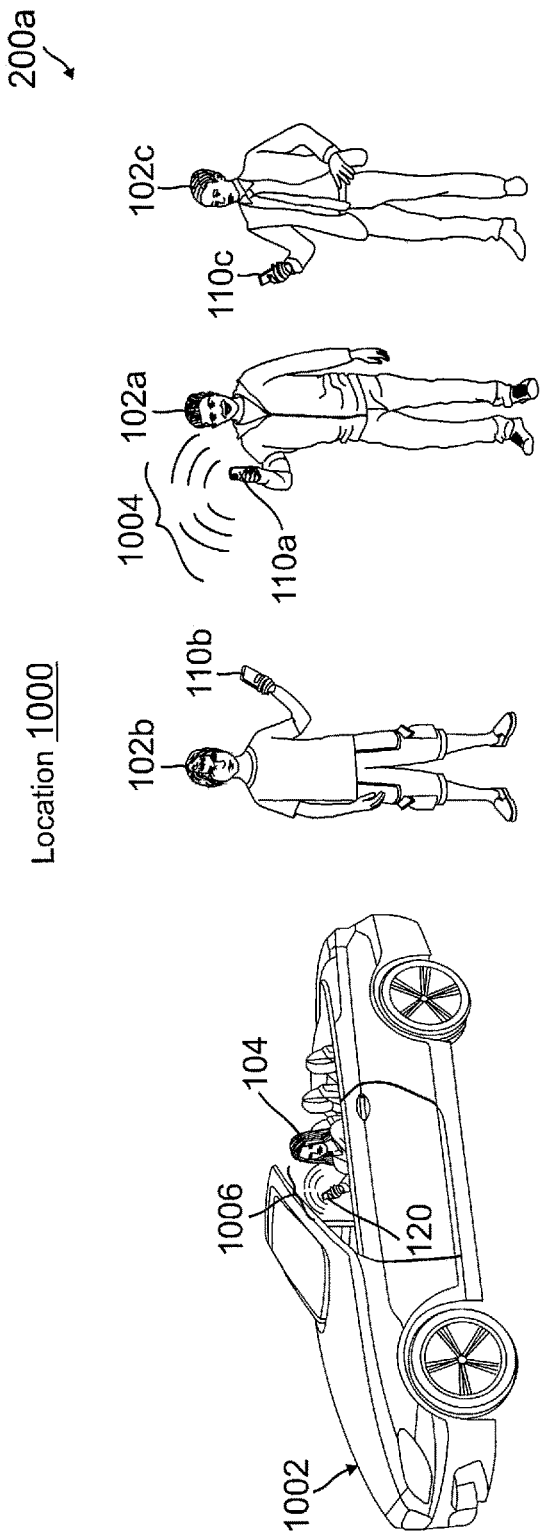
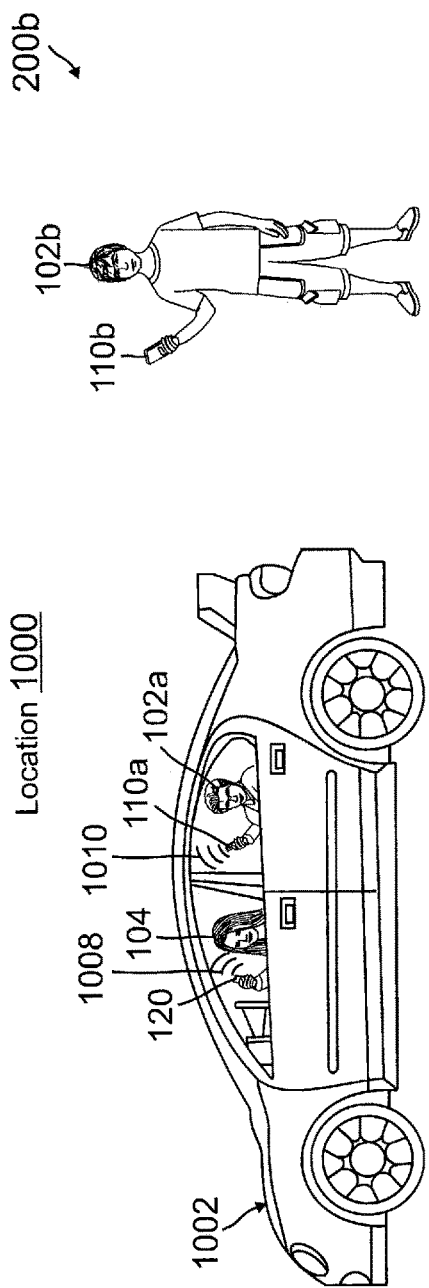

SHORT RANGE COMMUNICATIONS FOR SPECIFIC DEVICE IDENTIFICATION DURING MULTI-DEVICE PROXIMITY

TECHNICAL FIELD

The present application generally relates to wireless device identification and short range wireless communications, and more specifically to identifying a particular device within densely populated areas and detecting proximity of the device to a service provider device when a service is being sought or provided.

BACKGROUND

Users may utilize computing devices, such as mobile smart phones, to request location-specific services, such as a transportation service that provides pick-up at a specific location. In crowded areas, users may be required to meet their service provider in-person in order to provide identification to the service provider and insure proper provision of the requested service. This introduces additional time and error where in-person identification is difficult, locations are crowded, or parties fail to properly identify themselves. Moreover, when providing a transportation service, service providers are required to continuously monitor travel and determine when the service ends so that parties are properly billed and the transportation service is provided efficiently. This can require multiple inputs to devices during vehicle operation thereby increasing risk of accident and requiring additional work from all parties.

BRIEF DESCRIPTION OF THE DRAWINGS

FIG. 2A is an exemplary real-world environment where a user requesting a service may be identified through short range wireless communications and identity token exchange by their device when multiple devices are within a proximity range of a service provider's device, according to an embodiment, according to an embodiment;

FIG. 2B is an exemplary real-world environment where user proximity may be tracked through device pinging through short range wireless communications for accurate travel route detection, according to an embodiment;

Figure 1:
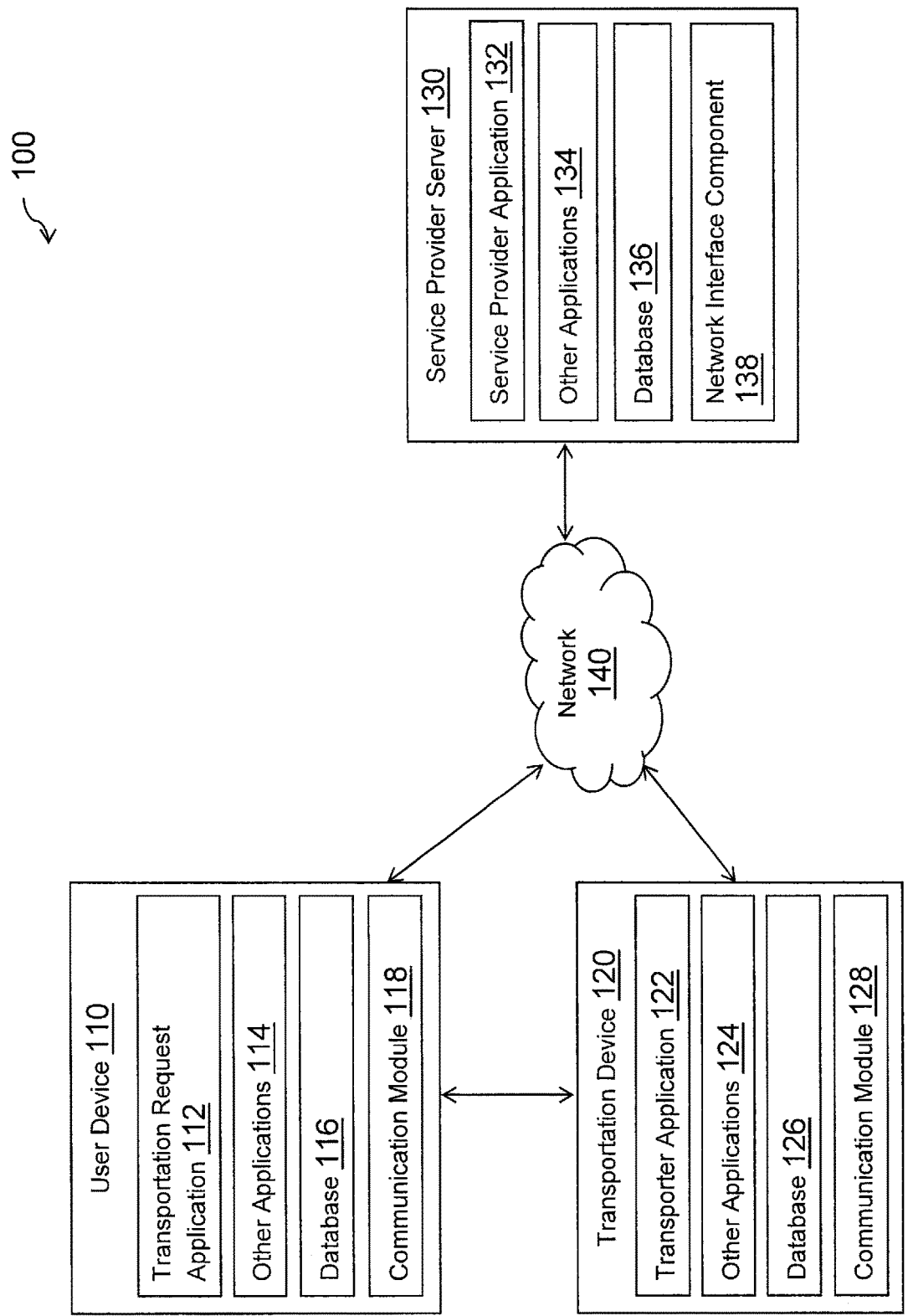
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for short range communications for specific device identification within areas that are densely populated with computing devices. Systems suitable for practicing methods of the present disclosure are also provided.

In order to provide services to users, service providers, such as transportation providers or other location-based service providers, may utilize device applications and network communications to exchange data and allow users to request location-specific services. A user may utilize a device application to specify a location and request the service at the location, such as a pick-up at the location for travel to a destination location. In order to identify the user's device at the location requested for the service, the user's device may initially provide identification information, such as an identity token or user information that may be compared and matched to an identity token, to the transportation provider's device. When the user's device detects that the user has arrived at the location (e.g., through a GPS locator), the user's device may begin broadcasting the identity token or other identification information through short range wireless communications, such as Bluetooth communications. The transportation provider's device may detect the token and connect to the device to identify that the user and the transportation provider are co-located. Additionally, a received signal strength indication (RRSI) may be used to detect a distance between the devices and alert the transportation provider's device and/or user's device when they are within a close proximity (e.g., threshold distance) for service provision. In other embodiments, the transportation provider may also or instead provide the identification information to the user's device when the service is requested, and the user's device may also or instead identify the transportation provider's device when receiving a broadcast token by the transportation provider's device.

Once connected, the devices may detect when the service is being provided, for example, when the transportation provider's device has begun travelling (e.g., through a change in geo-locations). The device may continuously ping each other during the travel to exchange data and determine whether the route taken by the transportation provider is the most efficient route based on available data (e.g., traffic, previous routes stored on the user's device, maps, etc.). The user's device may alert the transportation provider's device and/or another service provider if the route deviates within some threshold distance from a most efficient or selected route. The pinging may also allow the one or more of the devices to track fees accrued from the transportation service, such as distance and time fees owed by the user for use of the transportation provider. Additionally, the devices may detect when the device is no longer within a short range wireless communication range based on the pinging, for example, if the other device does not respond to one or more pings. If the devices are separated and no longer detectable through pinging, the transportation provider's and/or user's device may request a transaction for the fees owed for use of the transportation provider, which may be processed using a provided token or other data from the user's device.

Various transportation providers (e.g., variable cost transportation providers, such as LIBER®, LYFT®, shuttle services, taxi service, and other transportation services that may provide pick-up at a start location designated by a user) may utilize devices that provide short range wireless communications with a communication device for a user, such as using Bluetooth, Bluetooth Low Energy (BLE), LTE Direct, WiFi, or other communication protocol. A transportation provider may utilize an application on a device that may communicate with communication devices in possession of users in order to connect to the device and determine the user is within a specific distance or proximity to the device. The device may further establish a connection through short range wireless communications with the user's communication device, and may also communicate with a transportation management device or server to provide the transportation management, route determination, and electronic transaction processing to provide payment for transaction provider services and fees. Thus, the transportation provider's device may provide proximity detection of users at the start location in order to determine if the user is in proximity to the transportation provider.

In order to communicate through short range wireless communications with the communication device in possession of the user, the devices may use Bluetooth, Bluetooth Low Energy (BLE), LTE Direct, WiFi, or another communication protocol receivable by the communication device. When establishing a connection, the transportation provider's device and/or the user's device may emit a communication signal including an identifier for the device, such as an identity token or other identification information that uniquely identifies the device to another device. In certain embodiments, the broadcast token may be previously received from the other device and broadcast for unique identification by the other device. An application of the receiving device may execute specialized hardware and/or software to monitor for the short range wireless communications, for example, through a communication module. This may be done passively utilizing an "always-on" type signal, or may be performed actively by an application of the device after location detection at or nearby the start location (e.g., within a proximity range or geo-fence of the start location). When the device detects the signal and verifies the one or more identifiers, both devices establish a connection, where the connection may further enable the device to communicate additional information, and ping the other device to determine device presence within short range wireless proximity range, device distances through RSSI (e.g., Bluetooth RSSI), and/or exchange additional information.

In order to exchange the aforementioned identification information necessary to detect the devices and uniquely identify each device at a crowded location where multiple devices may be detected through short range wireless communications, one device may first provide the other with particular identification information. For example, when requesting a transportation service using an application over a network connection with the transportation provider's device and/or service provider's server, the user's device may execute an application that submits the transportation request and a pick-up/start location. The transportation request from the application may also include identification information of the user, such as an identity token or user identification information that may be matched to an identity token from a device, such as a name, phone number, device identifier, randomized code, etc. As previously discussed, the transportation provider may instead provide the user's device with the identification information for the transportation provider and the user's device may instead detect a broadcast from the transportation provider's device.

After exchange of the identification information, the devices may travel to the start location designated for transportation pickup. When arriving at the start location, one or more of the devices may activate their short range wireless transceiver, and begin broadcasting the identity token or other identification information that uniquely identifies that device to the other device. As previously discussed, the other device may detect the identification information and may establish a communication channel, determine a distance to the device using RSSI, or otherwise communicate between the devices. One or more of the devices may output a notification of the detected broadcast and/or establishment of the communication channel through short range wireless communications to alert the respective user or transportation provider of the presence of the other device. The notification may also include a distance determined through RSSI, and may track the distance as the devices come in close proximity (which may be set as by the service provider or the user and may depend on how densely populated the area is with other computing devices) so that the user and transportation provider may determine when the devices are in close proximity and the other party has been identified and located. This may allow for identification without in-person verbal exchange or visual identification by a party.

After detection of the device and establishment of the communication channel, the devices may ping each other at specific time intervals or randomly to detect a presence of the other device and determine whether the device is still within the short range wireless communication proximity range, such as a Bluetooth wireless range. Moreover, the user's device and/or the transportation provider's device may monitor the transportation provider's travel route to a destination location. After initially requesting the transportation service, the user's device may provide a destination location. The user's device may also provide a travel route with the destination location, or may provide the travel route from stored data (e.g., previously taken routes with a mapping application on the user's device) over the short range wireless communications (e.g., with the identity token or after establishing a connection). If the transportation provider deviates from the selected route by a predetermined distance or direction, the transportation provider's device or processing server may be notified so that the driver may be reported and cost for the transportation service may be adjusted accordingly.

The user's device and/or the transportation provider's device may provide the traveled route during travel and/or after completion to the transportation provider's server or central processing entity for determination of route statistics, travel lengths, and/or traffic. This may allow the transportation provider to optimize other future routes at or nearby the locations and travel routes taken. In order to detect an ending to the travel route and arrival at a destination location, one or more of the devices may detect that pings transmitted between the devices using the short range wireless connections are unreturned and the devices are no longer within wireless range to exchange communications and respond to pinging by a device. In response to this detection, the user's device may request generation of an electronic bill for the transportation service that may be received by the application on the user's device for electronic transaction processing. In other embodiments, the transportation provider's device may automatically generate the electronic bill and push the data to the user's device, or may request confirmation from the user's device that the trip has ended. The user may then use their device to perform electronic transaction processing with a service provider.

A service provider, such as PayPal® or other online payment and transaction processor, may provide payments and other services on behalf of users, merchants, and other entities. The service provider may provide payment accounts and/or payment processes to users that allow users to send and/or receive payments between the user and another user/merchant. For example, a user may wish to provide a payment for an electronic bill for the transportation service, initiate a transaction with another entity, or perform another payment process. A merchant, such as the transportation provider, may similarly send and/or receive payments, which may include requesting a payment from the user that utilizes the service. The service provider may be utilized to perform such electronic transaction processing. Thus, the user may provide a transaction processing request for the electronic bill, or the electronic bill may be automatically processed after detection of the devices no longer being in short range wireless communication range, signaling that the trip has ended. In such embodiments, a payment token may be exchanged, and the token may be used to insure payment by providing payment processing data to the service provider.

Additionally, the online service provider may provide payment accounts and digital wallet services, which may offer account services to send, store, and receive money, process financial instruments, and/or provide transaction histories. Such data may be accessible through an application, including the application for the transportation provider or a separate application that may process data from the service provider application, and utilized by providing authentication credentials. The payment provider may further include additional transaction management services, as well as account services for use with the payment provider and accessible through a device application, such as a browser application, dedicated application of the payment provider, and/or other application (e.g., merchant application) utilizing the processes and features provided by the payment provider. However, in other embodiments, transaction processing service using the online payment provider and the digital wallet may be integrated into the transportation provider's website/dedicated application.

In order to perform transaction processing of a transaction for the services provided by the transportation provider, the aforementioned digital token may be utilized to identify the user's (e.g., the service requester's) account with the transaction processor/service provider service. The digital token may be provided prior to, or during, the transportation service (e.g., with a transportation service request or through short range wireless communications during a transportation service), and may be stored locally to the transportation provider's device. The digital token may be utilized to pre-approve the user for use of the transportation provider's services and may further be utilized to process a payment from the user to the transportation provider. Thus, the user may not be required provide a payment instrument or token on completion of the transportation provider's services, and instead the previously exchanged token may be utilized to process the payment. Because the token may be stored locally by the transportation provider's device, the token may also be utilized to process a payment in low/no network connectivity environments when the transportation service ends. For example, the transportation provider's device may lose network connectivity at a destination point of the transportation service when the transportation provider's device generates a digital bill for use of the transportation services. However, due to the pre-approved and exchanged token, the user may be approved for a payment to the transportation provider for the digital bill. Thus, when the transportation provider's device resumes network connectivity, the transportation provider's device may resolve a payment using the previously exchanged token without risking fraud on the part of the user.

After processing the transaction, information may be sent to the transportation provider's device and/or server for driver monitoring for travel efficiency. Additionally, ending of the travel route through a lack of device pinging may be used to automatically submit a driver report based on the travel route, the pick-up/drop-off location, and the time/length of device communications. This may provide information for route optimization and improve driver efficiency. The route information may also be provided with an exact pick-up and drop-off location based on the detection of the identity token broadcast and the ending of the pinging, respectively, for optimization of future pick-up and/or drop-off locations nearby the same start and destination location. For example, if the pick-up location is designated as a busy street and instead a nearby parking lot is used, that starting location may be identified based on the location for establishment of the wireless connection between devices and used for future pick-ups based on the busy street.

Thus, two devices may utilize short range wireless communications that allow device detection within a short proximity range to increase speed of device detection within crowded device areas. By utilizing specific identity tokens and wireless broadcasting and pinging, travel pick-up, drop-off, and routing may be optimized. Moreover, this allows devices to uniquely identify each other so that confusion during in-person identification may be reduced by ensuring that users in possession of devices are within the proximity range. Further, the devices may communicate throughout the travel route to exchange data and optimize present and future travel locations and routing. This allows for fast electronic transaction generation and processing by eliminating the need for user input and network connectivity when ending a service.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a transportation device 120, and a service provider server 130, in communication over a network 140. A user (not shown) may utilize user device 110 to request a transportation service from transportation device 120, which may include designation of a start or pick-up location and further exchange identification information. When arriving at the location, user device 110 and/or transportation device 120 may activate a transceiver and broadcast or listen for wireless communications having the previously exchange identification information. User device 110 and transportation device 120 may connect and ping or exchange messages to determine when the devices are within communication range, and then detecting user device 110 has moved outside the communication range to indicate the trip has ended. After ending the route, service provider server 130 may provide transaction processing and/or optimization of routing based on tracked data.

User device 110, transportation device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

User device 110 may be implemented as a communication device that may utilize appropriate hardware and software configured for wired and/or wireless communication with transportation device 120 and/or service provider server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may be used and function similarly.

User device 110 of FIG. 1 contains a transportation request application 112, other applications 114, a database 116, and a communication module 118. Transportation request application 112 and other applications 114 may correspond to executable processes, procedures, and/or applications with associated hardware. In other embodiments, user device 110 may include additional or different modules having specialized hardware and/or software as required.

Transportation request application 112 may correspond to one or more processes to execute software modules and associated devices of user device 110 to request a transportation service that may include exchange of identification information, broadcast an identity token or receive a broadcast of a transportation provider's identity token from transportation device 120, connect to the device and maintain a connection, detect the connection is no longer available to signal that a trip has ended, and electronically process a transaction for the trip. In this regard, transportation request application 112 may correspond to specialized hardware and/or software of user device 110 to first submit a request for a transportation service to transportation device 120 and/or service provider server 130. The request may include a start location and a destination location. Additionally, the request may include identification information for user device 110, such as an identity token or other data that may be matched to an identity token for identification of user device 110.

After providing the request to transportation device 120, transportation device 120 may approve the request and indicate acceptance of the start location or designate another start location. In certain embodiments, transportation request application 112 may further receive identification information, such as an identity token, from transportation device 120. Transportation request application 112 may detect a location of user device 110 and determine when user device 110 is at the selected starting location. Transportation request application 112 may execute in the background of an operating system of user device 110 and be configured to establish connections, using communication module 118 of user device 110, with transportation device 120. The connection may be established with or without user input. For example, transportation request application 112 and/or transportation device 120 may broadcast a token, such as an identity token or a universally unique identifier (UUID), for reception by transportation device 120. If transportation device 120 acknowledges the token as identifying user device 110, transportation device 120 may respond with an identifier used for establishment of a communication session. Transportation request application 112 may utilize communication module 118 of user device 110 to communicate with transportation device 120 (e.g., over near field communication, Bluetooth, Bluetooth Low Energy, radio, infrared, LTE Direct, or other communication protocol). The identifier or identification information from user device 110 may include, be transmitted with, concatenated with, or otherwise bundled with additional information, such as a payment token, a travel route, and/or a destination. In other embodiments, different information may be transmitted to transportation device 120, such as an identifier for the user, a name or other personal information for the user, or other identifying information. In other embodiments, transportation request application 112 may utilize communication module 118 of user device 110 to receive an identity token broadcast by transportation device 120 also or instead, where transportation request application 112 may alternatively respond with the identity token for user device 110 to transportation device 120 for establishment of the communication session.

After establishing the communication session, user device 110 may either ping transportation device 120 or respond to pings from transportation device 120. During the communication session, user device 110 may determine where an optimal route is being utilized, and may output a notification and/or transmit a notification to transportation device 120 if the most optimal route is not being utilized. When user device 110 is moved outside of a short range wireless communication range from transportation device 120 (e.g., outside of Bluetooth communication range), user device 110 may end the communication session. Transportation request application 112 may request an electronic bill for services provided during the communication session, which may be populated to an interface of transportation request application 112 for processing. In certain embodiments, the bill may be automatically processed by transportation device 120 using a payment token provided during the communication session. Thus, transportation request application 112 may be used to initiate and/or generate transactions for transportation services as well as request transaction processing through service provider server 130. Once a transaction for an electronic bill is generated, transportation request application 112 may be used to request transaction processing for the transaction using services provided by service provider server 130. Where the user has an account with service provider server 130 and/or uses a payment instrument that service provider server 130 processes with an online financial entity, such as a bank for a debit/credit card, transportation request application 112 may utilize such account. Additionally, transportation request application 112 may be used to provide feedback, routing information, and other trip data from travel on the travel route to transportation device 120 and/or service provider server 130 for optimization.

In various embodiments, transportation request application 112 may correspond to a general browser application configured to retrieve, present, and communicate information over the Internet (e.g., utilize resources on the World Wide Web) or a private network. For example, transportation request application 112 may provide a web browser, which may send and receive information over network 140, including retrieving website information, presenting the website information to the user, and/or communicating information to the website, including electronic communications and associated information. However, in other embodiments, transportation request application 112 may include a dedicated application associated with transportation device 120, service provider server 130, and/or other entity, which may be configured to send and receive electronic communications and engage in electronic transaction processing. Thus, the user associated with user device 110 may utilize transportation request application 112 to engage in transactions with the transportation provider.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 140, or other types of applications. Other applications 114 may also include additional communication applications, such as email, texting, voice, and IM applications that allow a user to send and receive emails, calls, texts, and other notifications through network 140. In various embodiments, other applications 114 may include financial applications, such as banking, online payments, money transfer, or other applications, which may be utilized to maintain a user account with service provider server 130 and/or provide payments through transportation request application 112. Other applications 114 may also include other location detection applications, such as a mapping, compass, and/or GPS application, which may be used to determine a location for user device 110, as well as enter, store, and provide previous travel routes to transportation device 120 for use in monitoring and tracking travel during a transportation service. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

User device 110 may further include database 116 stored in a transitory and/or non-transitory memory of user device 110, which may store various applications and data and be utilized during execution of various modules of user device 110. Database 116 may include, for example, IDs such as operating system registry entries, cookies associated with transportation request application 112 and/or other applications 114, IDs associated with hardware of user device 110, or other appropriate IDs, such as IDs used for payment/user/device authentication or identification. Database 116 may store information for authentication of an account, such as identifiers, tokens, cookies, and/or authentication provided to user device 110 from service provider server 130. Additionally, database 116 may store identification information and/or identity tokens for user device 110 and/or received from transportation device 120, as well as connection information for a short range wireless connection. Data exchanged with transportation device 120 may also be stored in database 116, such as selected travel routes and electronic bill data.

User device 110 includes at least one communication module 118 adapted to communicate with transportation device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transportation device 120 may be implemented as a communication device that may utilize appropriate hardware and software configured for wired and/or wireless communication with user device 110 and/or service provider server 130. For example, in one embodiment, transportation device 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may be used and function similarly.

Transportation device 120 of FIG. 1 contains a transporter application 122, other applications 124, a database 126, and a communication module 128. Transporter application 122 and other applications 124 may correspond to executable processes, procedures, and/or applications with associated hardware. In other embodiments, transportation device 120 may include additional or different modules having specialized hardware and/or software as required.

Transporter application 122 may correspond to one or more processes to execute software modules and associated devices of transportation device 120 to receive a request for a transportation service from user device 110, where the request may include an exchange of identification information, broadcast an identity token for transportation device 120 or receive a broadcast of a user's identity token from user device 110, connect to user device 110 and maintain a connection, detect the connection is no longer available to signal that that a trip has ended, and provide an electronic bill for use of the transportation service. In this regard, transporter application 122 may correspond to specialized hardware and/or software of transportation device 120 to first receive a request for transportation service provided by user device 110 directly and/or through service provider server 130. The request may include a start location and a destination location. Additionally, the request may include identification information for user device 110, such as an identity token or other data that may be matched to an identity token for identification of user device 110. This identification information may be used by transporter application 122 to identify user device 110 through short range wireless communications when user device 110 is within communication proximity range (e.g., Bluetooth range), exchange token data, form a communication channel, and ping/identify the device and being in proximity to transportation device 120.

After receiving the request, the transportation service provider may approve the request and confirm the start location or designate another start location. Transporter application 122 may further receive identification information, such as an identity token, from user device 110. Transportation request application 112 may detect a location of transportation device 120 and determine when transportation device 120 is at the selected starting location. Transportation request application 112 may execute in the background of an operating system of transportation device 120 and be configured to establish connections, using communication module 128 of transportation device 120, with transportation device 120. For example, transporter application 122 may activate a wireless transceiver, such as a Bluetooth module, when transportation device 120 is at the starting location. The connection may be established with or without user input. For example, transporter application 122 may receive a broadcast of a token, such as an identity token or a universally unique identifier (UUID), from user device 110. If transporter application 122 acknowledges the token as identifying user device 110, transportation device 120 may respond with an identifier used for establishment of a communication session.

In order to identify and acknowledge the token, transporter application 122 may utilize a previously received token and/or identification information for user device 110, which may be matched to the token data received from user device 110 in the broadcast. The previously received data may be included with the request for the transportation service, or may be retrieved based on receiving the request (i.e., from user device 110 and/or service provider server 130). Transporter application 122 may utilize a previously received name, phone number, device identifier, randomized code, or other identity token to match to broadcast data from user device 110. Transporter application 122 may process multiple received broadcasts of identity tokens using the previously received identification information to uniquely identify user device 110 by performing the data matching.

Transporter application 122 may utilize communication module 128 of transportation device 120 to communicate with user device 110 (e.g., over near field communication, Bluetooth, Bluetooth Low Energy, radio, infrared, LTE Direct, or other communication protocol). Transporter application 122 may receive additional information, such as a payment token, a travel route, and/or a destination. In other embodiments, different information may be received by transportation device 120, such as an identifier for the user, a name or other personal information for the user, or other identifying information. In other embodiments, transporter application 122 may utilize communication module 128 of transportation device 120 to broadcast an identity token for transportation device 120 also or instead, where transporter application 122 may alternatively receive the identity token for user device 110 in response to the broadcast for establishment of the communication session.

After establishing the communication session, transportation device 120 may either ping user device 110 or respond to pings from user device 110. In other embodiments, a heartbeat signal from user device 110 and/or transportation device 120 may be utilized for detection of the other device. For example, user device 110 may transmit a heartbeat signal once co-located with transportation device 120 and provided notification that the service has begun (e.g., travel to a destination has started). This allows transportation device 120 to determine that user device 110 is in proximity to transportation device 120 and therefore utilizing the service. Where a ping may be utilized to receive responsive messaging, user device 110 may respond with a ping over short range communications that allows transporter application 122 to determine that user device 110 is within a range of transportation device 120. In other embodiments, transporter application 122 may be utilized to transmit the heartbeat signal to user device 110, where user device 110 detects the presence of transportation device 120 within a close proximity range or area of user device 110. Where user device 110 transmits a ping or other identification and presence request over short range communications and the ping is received by transportation device 120, transporter application 122 may respond with an update to user device 110 over the short range communications.

During the communication session, transportation device 120 may update user device 110 with additional information, such as route and/or travel information including travel fees. Transporter application 122 may also receive route information from user device 110, such as mapping data from a mapping application or process of user device 110. When user device 110 is moved outside of a short range wireless communication range from transportation device 120 (e.g., outside of Bluetooth communication range), transportation device 120 may end the communication session. Transporter application 122 may generate an electronic bill for the communication session, which may be populated to an interface of transporter application 122 for processing. In certain embodiments, the bill may be automatically processed by transportation device 120 using a payment token provided during the communication session. Additionally, transporter application 122 may be used to provide feedback, routing information, and other trip data from travel on the travel route to user device 110 and/or service provider server 130 for optimization and reporting of the transportation service.

In various embodiments, transporter application 122 may correspond to a general browser application configured to retrieve, present, and communicate information over the Internet (e.g., utilize resources on the World Wide Web) or a private network. For example, transporter application 122 may provide a web browser, which may send and receive information over network 140, including retrieving website information, presenting the website information to the user, and/or communicating information to the website, including electronic communications and associated information. However, in other embodiments, transporter application 122 may include a dedicated application associated with transportation device 120, service provider server 130, and/or other entity, which may be configured to send and receive electronic communications, provide transportation services, and engage in electronic transaction processing.

In various embodiments, transportation device 120 includes other applications 124 as may be desired in particular embodiments to provide features to transportation device 120. For example, other applications 124 may include security applications for implementing client-side security features, programmatic client applications for interfacing with appropriate application programming interfaces (APIs) over network 140, or other types of applications. Other applications 114 may also include additional communication applications, such as email, texting, voice, and IM applications that allow a user to send and receive emails, calls, texts, and other notifications through network 140. Other applications 114 may also include other location detection applications, such as a mapping, compass, and/or GPS application, which may be used to determine a location for transportation device 120, as well as track movement and travel routes of the transportation service provided by transportation device 120 for use in monitoring travel during a transportation service. Other applications 114 may include device interfaces and other display modules that may receive input and/or output information. For example, other applications 124 may contain software programs, executable by a processor, including a graphical user interface (GUI) configured to provide an interface to the user.

Transportation device 120 may further include database 126 stored in a transitory and/or non-transitory memory of transportation device 120, which may store various applications and data and be utilized during execution of various modules of transportation device 120. Database 116 may include, for example, IDs such as operating system registry entries, cookies associated with transporter application 122 and/or other applications 124, IDs associated with hardware of transportation device 120, or other appropriate IDs, such as IDs used for payment/user/device authentication or identification. Database 116 may store information for authentication of an account, such as identifiers, tokens, cookies, and/or authentication provided to transportation device 120 from service provider server 130. Additionally, database 126 may store identification information and/or identity tokens for transportation device 120 and/or received from user device 110, as well as connection information for a short range wireless connection. Additionally, tracked or selected travel routes and electronic bill data may be stored in database 116.

Transportation device 120 includes at least one communication module 128 adapted to communicate with user device 110 and/or service provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by transportation service provider and/or a transaction processing service provider, which may include service provided with transportation and/or payment processing providers and other type of financial service providers. In this regard, service provider server 130 includes one or more processing applications which may be configured to interact with user device 110, transportation device 120, and/or another device/server to facilitate transportation services and/or transaction processing. In one example, service provider server 130 may be provided by PAYPAL®, Inc. of San Jose, Calif., USA. However, in other embodiments, service provider server 130 may be maintained by or include another service provider that may provide services and/or data accessible through user device 110 and/or transportation device 120.

Service provider server 130 of FIG. 1 includes a service provider application 132, other applications 134, a database 136, and a network interface component 138. Service provider application 132 and other applications 134 may correspond to executable processes, procedures, and/or applications with associated hardware. In other embodiments, service provider server 130 may include additional or different modules having specialized hardware and/or software as required.

Service provider application 132 may correspond to one or more processes to execute modules and associated specialized hardware of service provider server 130 to provide a service to user device 110, which may be accessed through one or more applications of user device 110, for example, transportation services associated with a transportation request by user device 110 and/or transaction processing services for a provided transaction service. In this regard, service provider application 132 may correspond to specialized hardware and/or software to receive a transportation request from user device 110 where service provider server 130 acts as an intermediary to organize and/or transmit transportation requests, and respond to the request, for example, by providing data for a transportation service provider associated with transportation device 120 to user device 110 and alerting transportation device 120.

Service provider application 132 may be utilize to determine that a connection has been broken between user device 110 and transporter device 120 based on receiving information that one of the devices is no longer responsive to one or more pings or that a heartbeat signal of the other device is no longer detected. Based on the received data, service provider application 132 may end a transportation service and generate a bill, which may be provided to user device 110 and/or transportation device 120. However, in other embodiments, the detection of the end of the service based on the unresponsive or undetected device within a signaling proximity range of short range wireless communications may be performed by user device 110 and/or transportation device 120. Service provider application 132 may further receive travel route data, such as tracked routes, pick-up and drop-off locations, and changes to travel during use of a transportation provider, for use in route optimization and transportation provider efficiency and reporting, such as driver monitoring. In various embodiments, service provider application 132 may also be used to track travel routes during use of the transportation provider associated with transportation device 120 to determine if the transportation provide deviates from a route, takes a more efficient route, or requires other reporting.

In certain embodiments, service provider application 132 may be used to receive and/or transmit information from user device 110 for establishing accounts and digital wallets, as well as processing and completing of one or more transactions for use of the transportation provider (e.g., an electronic bill from user device 110 and/or transportation device 120). The user associated with user device 110 may establish a payment account with service provider application 132 by providing personal and/or financial information to service provider server 130 and selecting authentication credentials. In various embodiments, the financial information may include payment instrument information, such as account numbers. The account may be used to send and receive payments. The payment account may be accessed and/or used through a browser application and/or dedicated payment application executed by user device 110. Service provider application 132 may receive a payment request from user device 110 for a transaction between the user the transportation provider associated with transportation device 120, which may include identifiers, tokens, or other data used for transaction processing with an electronic bill. Service provider application 132 may process a payment, which may include a fee from the user or the transportation provider for use of services provided by service provider server 130.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 140, or other types of applications. Other applications 134 may contain software programs, executable by a processor, including a graphical user interface (GUI), configured to provide an interface to the user when accessing service provider server 130. In various embodiments where not provided by service provider application 132, other applications 134 may include connection and/or communication applications.

Additionally, service provider server 130 includes database 136. As previously discussed, one or more of a user and a seller may establish a payment account including a digital wallet with service provider server 130. Accounts in database 136 may include entity information, such as name, address, birthdate, payment/funding information, additional user financial information, and/or other desired user data. An entity may link to their respective accounts through an account, user, merchant, and/or device ID, as well as a generated token/cookie, which may be provided to user device 110 and/or transportation device 120 for use. Additionally, received transportation requests, track travel data, and payment information for electronic bills may be stored in database 136.

In various embodiments, service provider server 130 includes at least one network interface component 138 adapted to communicate user device 110 and/or transportation device 120 over network 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

FIG. 2A is an exemplary real-world environment where a user requesting a service may be identified through short range wireless communications and identity token exchange by their device when multiple devices are within a proximity range of a service provider's device, according to an embodiment. Environment 200a corresponds to a real-world environment where multiple device availability may cause misidentification of a particular device. In this regard, transportation device 120 may uniquely identify a particular user device using identity token exchange, short range wireless communications, and device proximity detection. Environment 200a includes a user device 110a, a user device 110b, and a user device 110c correspond to user device 110 discussed in reference to system 100 of FIG. 1.

A user 102a may request transportation services for pick-up at a location 1000 through user device 110a in possession of user 102a. The request may be transmitted to transportation device 120 for a transportation provider 104 utilizing vehicle 1002. Prior to arriving at location 1000, user device 110a may provide an identity token or other identification information to transportation device 120. This data token or other data may be stored by transportation device 120, such as cached or stored to long term memory, and may be matched to data in a broadcast by user device 110a over short range wireless communications to determine that user device 110a, and thus user 102a, are within a wireless proximity range, such as a communication radius around user device 110a broadcasting the token. In further embodiments, transportation device 120 may instead or also provide an identity token or other identification to user device 110a prior to arriving at location 1000, and user device 110a may similarly receive a broadcast of data from transportation device 120 over a wireless proximity range from transportation device 120. Thus, user device 110a may also or instead be capable of detecting when user device 110a is within short range communication range of transportation device 120.

When user 102a arrives at location 1000, user device 110a may activate a wireless transceiver and begin broadcasting the identification information or an identity token used to match to the previously provided data. Further, as transportation provider 104 travels to location 1000 in vehicle 1002, transportation device 120 may also activate a wireless transceiver for receipt of a broadcast from user device 110a and matching of the data to the previously received data with the transportation request from user device 110a. Location 1000 may further include a user 102b utilizing user device 110b and a user 102c utilizing user device 110c. Thus, all three of user devices 110a-c may be discoverable at location 1000 through non-unique identification, such as general device detection. However, instead user device 110a may transmit broadcast signals 1004 having the identification information, token, or other data. Transportation device 120 may receive the data, and may establish a communication session through wireless signaling 1006. Wireless signaling 1006 may allow the devices to exchange information and detect that the devices are within wireless signaling proximity. Thus, transportation provider 104 may be alerted that user 102a is at location 1000 and within a proximity range to be retrieved for use of vehicle 1002 for the transportation service. Moreover, wireless signaling 1006 may be used to establish a distance between the devices and allow an application on each device to notify user 102a and transportation provider 104 of the presence, distance, and identification of each other so that co-locating user 102a and transportation provider 104 may be facilitated. After user 102a locates vehicle 1002 using wireless signaling 1006 between user device 110a and transportation device 120, user 102a may enter vehicle 1002 and user device 110a and transportation device 120 may begin pinging each other, as discussed in FIG. 2B FIG. 2B is an exemplary real-world environment where user proximity may be tracked through device pinging through short range wireless communications for accurate travel route detection, according to an embodiment. Environment 200b corresponds to a real-world environment where a starting and ending of a transportation service may be tracked by device-to-device communications and wireless pinging through short range wireless communications. In this regard, transportation device 120 may uniquely identify user device 110a for pick-up and during travel, and further determine an end to transportation service use when short range wireless communications between user device 110a and transportation device 120 end.

In environment 200b, user device 110a may be uniquely identified over user device 110b for user 102b based on previous exchange of identification information during transportation service request and reservation. For example, user device 110a for user 102a may be detected through short range wireless communications and proximity detection, while user device 110b may not respond or may not match the identification information. Thus, user 102a may enter vehicle 1002. After previously establishing a communication session, user device 110a may ping and/or respond to pings continuously and/or intermittently at a time interval with transportation device 120. For example, pings 1008 may be transmitted by transportation device 120 and responses 1010 from user device 110a may indicate that transportation device 120 is within wireless signaling range of user device 110a. Thus, user device 110a and/or transportation device 120 may determine that transportation services provided by transportation provider 104 are currently in use and fees/rates for the services may accrue.

However, when one or more of pings 1008 are not received by user device 110*a* from transportation device 120, and responses 1010 are not detected by transportation device 120 (or vice versa), user device 110*a* and/or transportation device 120 may determine that they are no longer within wireless proximity range, and therefore user 102*a* is no longer located within vehicle 1002 or within a short distance to the vehicle. Thus, user device 110*a* may automatically request an electronic bill for transportation services over a network connection with transportation device 120 or a service provider, and process the bill using an online account with a service provider. This may be done automatically without user input. In other embodiments, transportation device 120 may instead automatically generate the bill and push the bill to user device 110*a* for approval and/or processing without requiring transportation provider 104 to provide input requesting generation and transmission of the bill.

Figure 3:
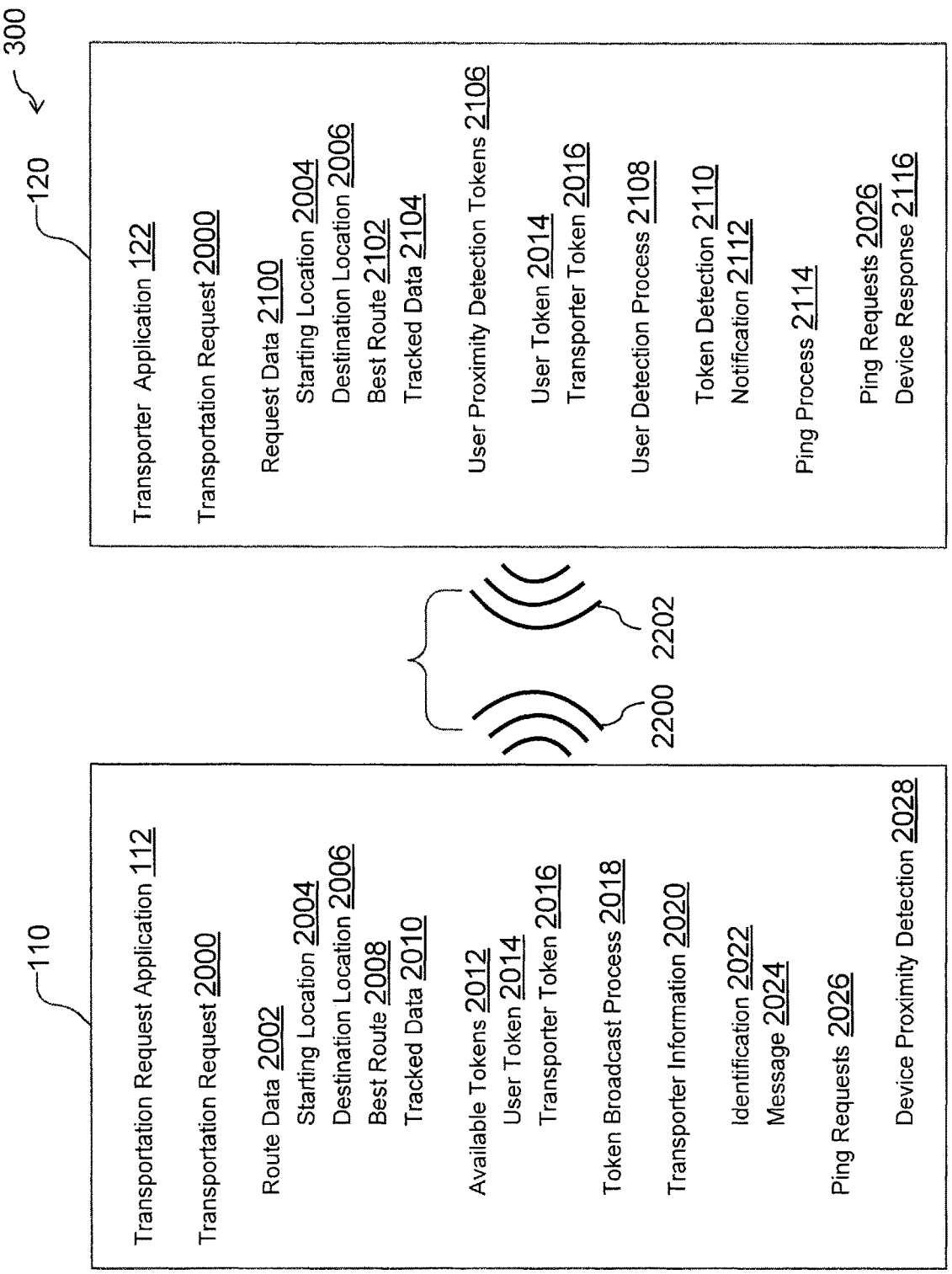
FIG. 3 is a block diagram of an exemplary computer system environment having two devices interacting to identify each other and track each other's proximity during short range wireless communications, according to an embodiment.

FIG. 3 is a block diagram of an exemplary computer system environment having two devices interacting to identify each other and track each other's proximity during short range wireless communications, according to an embodiment. Environment 300 of FIG. 3 includes user device 110 and transportation device 120 as discussed in reference to system 100 of FIG. 1. In this regard, user device 110 executes transportation request application 112 and transportation device 120 executes transporter application 122 having the processes and features discussed in reference to system 100 of FIG. 1.

For example, transportation request application 112 may initially generate a transportation request 2000 for transportation device 120, which may include route data 2002 having a starting location 2004, a destination location, and optionally a best route 2008, which may be determined using data stored on user device 110. When communicating transportation request 2000 to transportation device 120, available tokens 2012 may be used, such as a user token 2014 or other identification data. Transporter application 122 may receive transportation request 2000 having request data 2100. Additionally, transporter application 122 may determine a processed route 2102 based on best route 2008 and/or other data from a service provider. Transporter application 122 may receive user proximity detection tokens 2106, which may include user token 2014. In certain embodiments, transporter application 122 may respond to user device 110 with transporter token 2016, which may be used to uniquely identify transportation device 120 to user device 110.

Once at starting location 2004, user device 110 may execute token broadcast process 2018 with user detection process 2108 of transporter application 122. This may cause one or more of available tokens 2012 to be broadcast over wireless signaling 2200. Transporter application 122 may determine token detection 2110 based on wireless signaling 2200 and the selected one of available tokens 2012 in wireless signaling 2200. In response, transportation device 120 may establish a communication session 2202 with user device 110. Additionally, transporter application 122 may output a notification 2112 to the transportation service provider that indicates user device 110 is within short range wireless proximity signaling range. Transportation request application 112 may determine identification 2022 based on communication session 2202 and transporter token 2016 identifying transportation device 120, as well as output a message 2024 from transportation device 120. Further, transporter application 122 may execute ping process 2114 that may output ping requests 2026 during communication session 2202. Transportation request application 112 may receive ping requests 2026 that may be used for device proximity detection 2028 and response with device response 2116 to maintain identification of the device within wireless proximity. Once communication session 2202 ends, ping requests 2026 may go unanswered and determination of a trip ending or ended may be determined.

Figure 4:
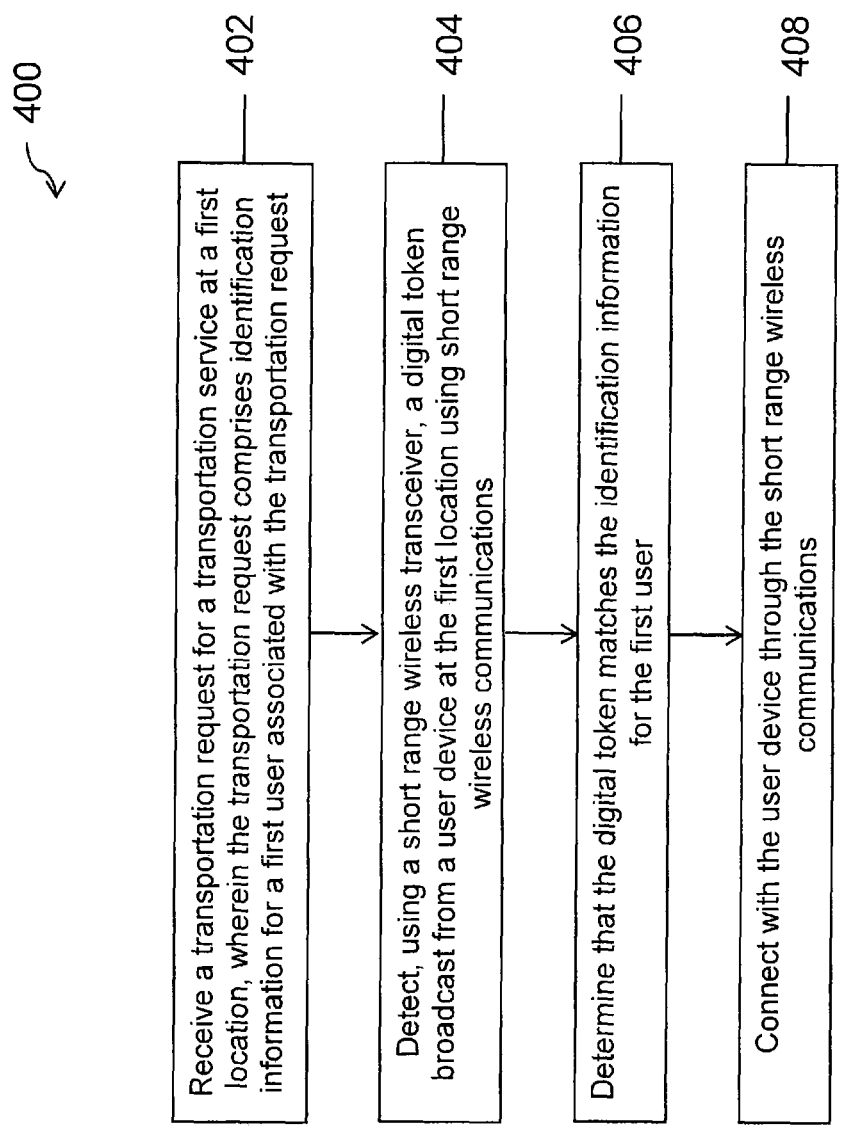
FIG. 4 is an exemplary process flowchart for short range communications for specific device identification during multi-device proximity, according to an embodiment.

FIG. 4 is an exemplary process flowchart for short range communications for specific device identification during multi-device proximity, according to an embodiment. Note that one or more steps, processes, and methods described herein with reference to flowchart 400 in FIG. 4 may be omitted, performed in a different sequence, or combined as desired or appropriate.

At step 402 of flowchart 400, a transportation request for a transportation service at a first location is received, for example, by a system based on user input, wherein the transportation request comprises identification information for a first user associated with the transportation request, such as a digital token. The system may include a short range wireless transceiver.

A digital token broadcast from a user device at the first location may be detected using short range wireless communications and the short range wireless transceiver, at step 404 of flowchart 400. In order to detect the broadcast, the system may determine if the system's location matches the first location, and if so, activate the wireless transceiver to detect the broadcast. Prior to detecting, the system may transmit a unique identifier used in the broadcast to the user device, where the identifier uniquely identifies the system. In other embodiments, the digital token may be received from the user device and stored in a data cache for comparison to the received digital token. The digital token may comprise a time-limited digital token generated by the user device. Thus, the digital token may be invalidated after the transportation service has ended. The digital token may also correspond to an identity token for the first user and/or user device.

At step 406 of flowchart 400, it is determined that the digital token matches the identification information for the first user. In various embodiments, flowchart 400 may continue with pinging the user device for a response indication at a time interval through the short range wireless communications and in response to failing to receive the response indication from the pinging, determining that the transportation service has ended at a second location. For example, a communication session may be generated based on the matching the token and the information, and the devices may be pinged during the session. This may include periodically transmitting a message to the user device, where the message requests a response from the user device over short range wireless communications (e.g., to detect a present of the user device nearby the system). The system may wait a threshold amount of time to allow the user device to respond, and. in response to failing to receive a response after that threshold amount of time, the system may determine that the user device is not nearby the system. In other embodiments, the user device may transmit a heartbeat signal or other presence identification over short range wireless communications, which may be detected by the system and used to identify that the user device's presence is nearby the system.

Prior to transmitting a ping to the user device, the system may determine a distance between the two, for example, using RSSI, and a notification of the distance may be output on one or more of the devices. This may include using Bluetooth and a Bluetooth RSSI measurement to determine the distance. Additionally, a tracking process for the transportation service from the first location to the second location may be ended based on the determining that the transportation service has ended through the unresponsive pinging between the devices. Thus, a bill may be transmitted to the user device or a service provider based on the tracking process and the transportation service. However, if the second location does not match a previously provided destination location, the system may query the user device for confirmation.

Additionally, a route from the first location to the second location may be tracked and transmitted to the service provider of optimization and reporting. The system may also receive routing data from the service provider for the system's current location to the requested second location. The system may use the routing information to determine a proposed route or receive one from the use device, and an actual route may be monitored by the system and/or the user device to compare and alert a service provider or the other device if the actual route deviates substantially from the proposed route. The digital token may also comprise a payment token, which may be used for processing an electronic transaction associated with the electronic bill. Thus, the system may utilize the digital token for transaction processing for the actual route automatically when reaching the destination.

Figure 5:
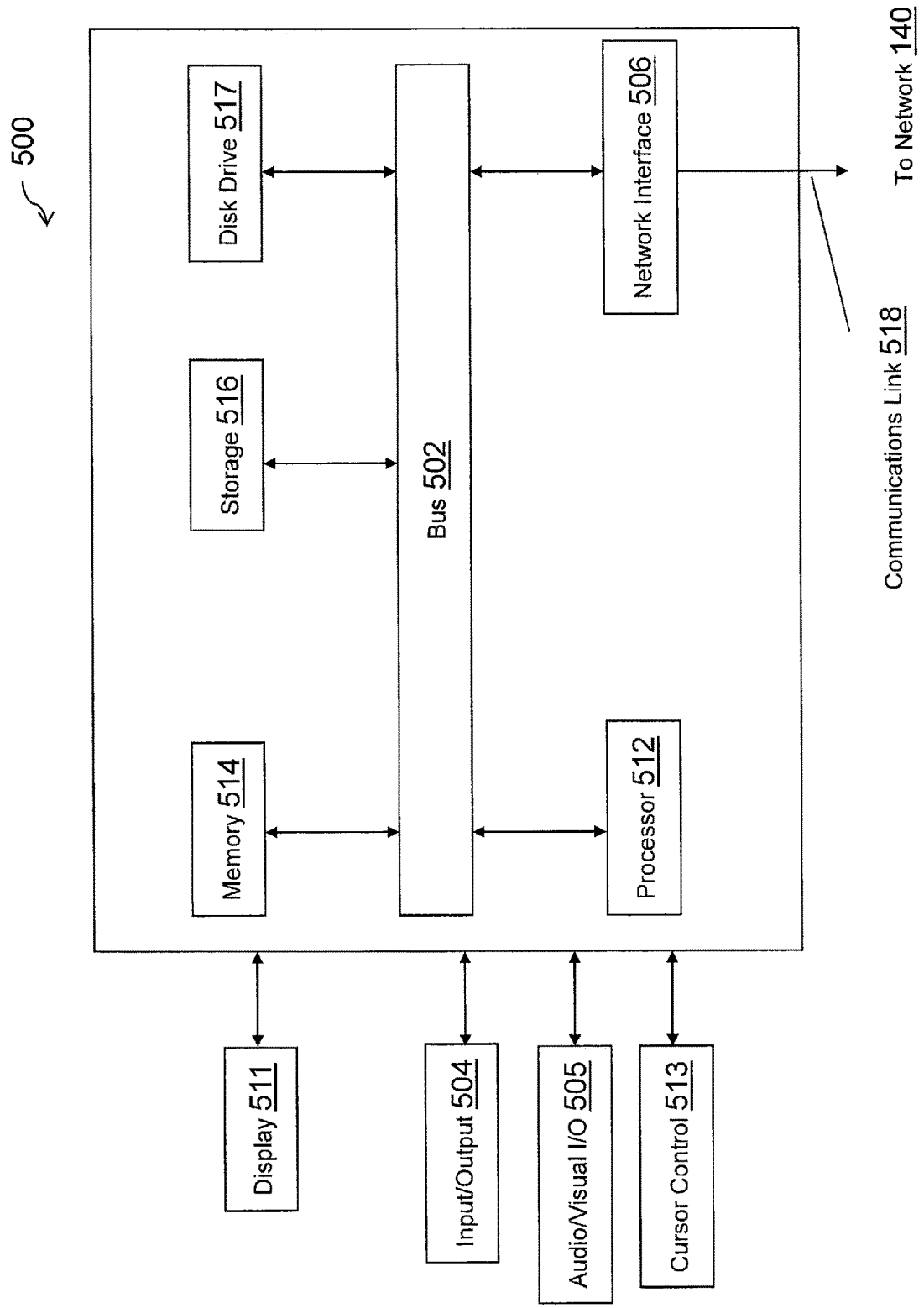
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a short range wireless transceiver;
a non-transitory memory; and
one or more hardware processors coupled to the non-transitory memory and configured to read instructions from the non-transitory memory to cause the system to perform operations comprising:
receiving a transportation request for a transportation service at a first location, wherein the transportation request comprises identification information for a first user associated with the transportation request;
detecting, using the short range wireless transceiver, a digital token broadcast from a user device at the first location using short range wireless communications;
determining that the digital token corresponds to the identification information for the first user;
in response to the determining that the digital token corresponds to the identification information, connecting with the user device through the short range wireless communications;
determining a distance between the system and the user device using a signal strength of the short range wireless communications;
determining that the transportation service has begun at the first location based on the distance;
receiving a destination location of the first user for the transportation request;
determining, based on a plurality of completed passenger drop-offs associated with the destination location by a plurality past transportation services, a drop-off location associated with the destination location;
outputting a notification in an application interface of the system or the user device based on the distance and the drop-off location;
periodically transmitting a message to the user device through the short range wireless communications; and
in response to failing to receive a response to the message within a predetermined amount of time, determining that the transportation service has ended at a second location.

2. The system of claim 1, wherein the short range wireless transceiver comprises a Bluetooth transceiver using Bluetooth for the short range wireless communications, and wherein the determining the distance is based on a Bluetooth received signal strength indicator (RSSI) measurement.

3. The system of claim 1, wherein prior to the detecting, the operations further comprise:
determining that the system is located at the first location; and
activating the short range wireless transceiver.

4. The system of claim 1, wherein the operations further comprise:
ending a tracking process for the transportation service from the first location to the second location based on the determining that the transportation service has ended.

5. The system of claim 4, wherein the operations further comprise:
transmitting a bill to one of the user device or a service provider based on the tracking process.

6. The system of claim 4, wherein the operations further comprise:
determining that the second location does not match the destination location from the user device; and
querying the user device for confirmation of the ending the tracking process.

7. The system of claim 1, wherein prior to the detecting, the operations further comprise:
transmitting an identifier to the user device, wherein identifier uniquely identifies the system when broadcast by the user device with the digital token.

8. The system of claim 1, wherein prior to the detecting, the operations further comprise:
receiving the digital token from the user device; and
storing the digital token.

9. The system of claim 1, wherein the operations further comprise:
tracking, using a GPS locator, a route from the first location to the second location at a user destination of the transportation service; and
transmitting the route to a service provider.

10. The system of claim 9, wherein the operations further comprise:
receiving routing data from the service provider based at least on a current location of the system, the destination location, or the drop-off location.

11. The system of claim 1, wherein the digital token comprises a time-limited digital token generated by the user device, and wherein the digital token is invalidated after the transportation service has ended or wiped from the system after the transportation service has ended.

12. The system of claim 1, wherein the determining the distance uses a RSSI.

13. A method comprising:
transmitting, by a first device of a user through an application, a request for a transportation pickup at a starting geo-location;
receiving a destination geo-location of the user;
determining, based on a plurality of completed passenger drop-offs associated with the destination geo-location by a plurality past transportation services, a drop-off geo-location associated with the destination geo-location;
detecting, by the first device, that the first device is within a geo-fenced area for the starting geo-location;
broadcasting, using a communication module of the first device, an identity token associated with the transportation pickup over short range wireless signaling;
in response to receiving an acknowledgement notification of the identity token from a second device associated with the transportation pickup, establishing a communication session between the first device and the second device;
determining a distance between the first device and the second device using a signal strength associated with the communication session;
determining that the transportation pickup has been performed at the starting geo-location based on the distance; and
displaying a message based on the determining that the transportation pickup has been performed, wherein the message is associated with at least the drop-off geo-location.

14. The method of claim 13, further comprising:
transmitting one or more pings during the communication session;
in response to not receiving a ping for a threshold period of time, ending the communication session; and
requesting a bill when the communication session has ended.

15. The method of claim 13, further comprising:
receiving, by the first device, an acceptance of the request for the transportation pickup from the second device; and
transmitting the identity token to the second device.

16. The method of claim 13, further comprising:
receiving, by the first device, an acceptance of the request for the transportation pickup from the second device, wherein the acceptance comprises the identity token for the second device, and wherein the identity token is valid for a limited time during the communication session.

17. The method of claim 13, further comprising:
determining, by the first device using a mapping application on the first device, a proposed route from the starting geo-location to the destination geo-location associated with the transportation pickup;
monitoring, using a geo-location detection process of the first device, an actual route from the starting geo-location to the destination geo-location; and
comparing the actual route to the proposed route.

18. The method of claim 17, wherein the starting geo-location comprises a detected GPS location by the geo-location detection process, and wherein the method further comprises:
alerting a service provider or the second device if the actual route deviates from the proposed route by a predetermined threshold.

19. A non-transitory machine-readable medium having stored thereon machine-readable instructions executable to cause a machine to perform operations comprising:
receiving, by a first mobile device of a transportation provider, a service request for transportation at a first location from a second mobile device of a user, wherein the service request comprises a first token identifying the second mobile device;
transmitting, by the first mobile device an acceptance notification of the service request to the second mobile device, wherein the acceptance notification comprises a second token identifying the first mobile device;
broadcasting, using a wireless transceiver of the first mobile device, the first token through short range wireless communication;
receiving, through the wireless transceiver, the second token in response to the broadcasting the first token;
establishing a communication channel between the first mobile device and the second mobile device;
determining a distance between the first mobile device and the second mobile device using a signal strength associated with the communication channel;
determining that the transportation has begun at the first location based on the distance; and
receiving a second location associated with a destination of the user;
determining, based on a plurality of completed passenger drop-offs associated with the second location by a plurality past transportations, a drop-off location associated with the second location; and
displaying a message based on the determining that the transportation has begun, wherein the message is associated with at least the second location.

20. The non-transitory machine-readable medium of claim 19, wherein the first token comprises a payment token for an account used by the second mobile device, and wherein the operations further comprise:
processing an electronic transaction associated with the transportation using the payment token.

* * * * *